(12) United States Patent
Trudeau

(10) Patent No.: US 7,540,122 B2
(45) Date of Patent: Jun. 2, 2009

(54) DRYWALL REPAIR TOOL AND METHOD

(76) Inventor: Walter H. Trudeau, 12768 Julington Ridge Dr., Jacksonville, FL (US) 32258

( * ) Notice: Subject to any disclaimer, the term of this patent is extended or adjusted under 35 U.S.C. 154(b) by 644 days.

(21) Appl. No.: 11/176,853

(22) Filed: Jul. 7, 2005

(65) Prior Publication Data
US 2007/0006548 A1    Jan. 11, 2007

(51) Int. Cl.
*E02D 37/00* (2006.01)
(52) U.S. Cl. .................... 52/514; 52/741.1; 52/741.12; 52/DIG. 1
(58) Field of Classification Search ............. 52/514, 52/742.1, 742.12, DIG. 1; 408/24, 27, 30, 408/204; 451/548; 407/29.13; 30/444–446
See application file for complete search history.

(56) References Cited

U.S. PATENT DOCUMENTS

| | | | | |
|---|---|---|---|---|
| 1,946,416 A | * | 2/1934 | Seiler | 407/29.13 |
| 1,990,991 A | | 2/1935 | Heubach | |
| 3,058,199 A | * | 10/1962 | Cave et al. | 407/54 |
| 3,164,933 A | * | 1/1965 | Labowsky | 451/548 |
| 3,327,749 A | | 6/1967 | Hunn | |
| 3,672,785 A | * | 6/1972 | Byrne | 408/206 |
| 3,716,951 A | * | 2/1973 | Walters | 451/548 |
| 4,082,475 A | | 4/1978 | Kuder | |
| 4,121,337 A | | 10/1978 | Parker | |
| 4,203,692 A | * | 5/1980 | Jensen | 408/96 |
| 4,297,823 A | * | 11/1981 | Keisler | 52/514 |
| 4,894,971 A | | 1/1990 | Cortese | |
| 4,924,578 A | | 5/1990 | Chagnon et al. | |
| 5,123,217 A | * | 6/1992 | Ishikawa et al. | 451/541 |
| 5,190,611 A | | 3/1993 | Cologna et al. | |
| 5,219,250 A | * | 6/1993 | Voorhees | 407/34 |
| 5,224,803 A | | 7/1993 | Lallier | |
| 5,239,784 A | * | 8/1993 | Stanfield | 451/548 |
| 5,255,475 A | * | 10/1993 | Kotthaus | 451/548 |
| 5,353,568 A | * | 10/1994 | Silva | 52/514 |
| 5,399,116 A | * | 3/1995 | Ellis et al. | 451/540 |
| 5,466,100 A | * | 11/1995 | Ahluwalia | 408/224 |
| 5,540,613 A | * | 7/1996 | Kamiyama et al. | 451/24 |
| 5,743,682 A | * | 4/1998 | Chaney, Sr. | 408/79 |
| 5,899,796 A | * | 5/1999 | Kamiyama et al. | 451/61 |
| 6,027,503 A | | 2/2000 | Khalili et al. | |
| 6,045,302 A | * | 4/2000 | Orr | 408/83 |
| 6,200,197 B1 | | 3/2001 | Eriksson et al. | |
| 6,247,283 B1 | * | 6/2001 | Slabaugh et al. | 52/514 |
| 6,746,186 B2 | * | 6/2004 | Ukai | 408/226 |
| 6,893,194 B2 | * | 5/2005 | Jones et al. | 408/204 |
| 6,935,084 B1 | * | 8/2005 | Larsen | 52/514 |

* cited by examiner

*Primary Examiner*—Richard E Chilcot, Jr.
*Assistant Examiner*—Jessica Laux
(74) *Attorney, Agent, or Firm*—Thomas C. Saitta

(57) ABSTRACT

A drywall repair tool for repairing a localized defect in drywall, and the method of using same, the tool having a conical abrading surface, a circular cutting rim and an annular abutment collar, whereby rotation of the tool creates a hole having a conical wall, where the inner diameter of the hole is smaller than the outer diameter, such that a replacement plug having a conical wall corresponding to the size and configuration of the conical wall of the hole can be readily positioned within the hole and adhesively secured.

20 Claims, 2 Drawing Sheets

1

DRYWALL REPAIR TOOL AND METHOD

BACKGROUND OF THE INVENTION

This invention relates generally to the field of drywall, wallboard or similar panel repair tools and to methods for repairing dents, holes or other localized defects in installed panels of this type.

Many panel materials used in the construction of walls, ceilings, doors or the like, such as drywall, wallboards, acoustic tiles and thin wood, are susceptible to localized damage in the form of dents, holes, cracks or other localized defects or damage from accidents. In addition, localized damage can result from the installation or removal of nails, picture mounts, light fixtures or the like. In many instances, the panel material is such that a localized repair of the damage can be readily accomplished. A common technique to repair drywall, for example, is to cut out and remove a small area around the damage using a drywall knife, keyhole saw or drill. A backing material is then secured to the rear of the hole so created, such as by gluing a piece of wood or a screen material. Once the backing is secured, a replacement plug of drywall material is cut out that has the same configuration as the hole. The replacement plug is then pressed into the hole and glued to the backing, the gap between the plug and the drywall exterior is filled with spackle, drywall compound or the like and sanded, and the final result is painted over to match the original wall color. This is a time-consuming technique, and in particular affixation of the backing material to the rear of the hole to support the replacement plug is often difficult for an unskilled person to accomplish.

It is an object of this invention to provide a method of drywall or similar panel repair, and a tool to accomplish the same, where the time, effort and skill level required to make the repair are greatly reduced from the common method. It is an object to provide such a method and tool eliminates the need for a backing material to be applied to the rear of the panel being repaired. It is an object to provide a method and tool that produces a repair hole when removing the damaged area that is uniform and consistent, such that replacement plugs can be pre-manufactured. Additional objects not expressed above will be apparent after review of the disclosure to follow.

SUMMARY OF THE INVENTION

The invention is a method and tool for repairing panels having localized damage in the form of a crack, dent, hole or the like, where the panels are formed of a material that can be cut and abraded, such as for example drywall, wallboard, soft wood, acoustic tile, etc. The invention is particularly suited for drywall repair, and as such from this point forward shall be described in terms of drywall repair, and it is to be understood that reference to drywall in this disclosure and in the claims shall be taken to include other panel materials having similar properties to drywall.

The drywall repair tool comprises a handheld or preferably rotary drill operated tool that creates a symmetrical, uniform hole in the drywall by removing a circular area of drywall surrounding the localized damage. The tool comprises an abrading surface in the shape of a truncated cone, with the smaller diameter distal end of the abrading surface terminating in a circular rim on which is provided cutting members in the form of teeth, abrasive particles or the like, which are capable of cutting through drywall material. The abrading surface comprises abrading members in the form of teeth, shavers, ridges, abrasive particles or the like that are capable of abrading the drywall material. An annular flange or collar extending perpendicularly to the axis of rotation for the tool, is mounted on the larger diameter proximal end of the abrading surface. A handle for manual use and/or a shaft for insertion into a rotary drill is disposed on the proximal side of the tool.

To repair damaged drywall, the cutting members on the distal rim are rotated and advanced to cut through the drywall. As the tool is advanced, the abrading surface contacts the drywall and begins removing material from the periphery of the circular hole created by the cutting members. Because the abrading surface has a conical configuration, the edge surface is angled rather than perpendicular to the drywall surface, such that the outer diameter of the finished hole is greater than the inner diameter. The tool is rotated and advanced until the annular collar abuts the outer surface of the drywall. In this manner the hole size and configuration created by the tool remains uniform, such that a pre-manufactured replacement plug of drywall, resin or other material may be placed into the hole. The repair is then finalized in standard manner, using spackle, drywall compound or the like to seal the gap between the plug and the drywall.

BRIEF DESCRIPTION OF THE DRAWINGS

FIG. 3 is a cross-sectional view showing the configuration of the hole created in the drywall and a side view of a replacement plug prior to insertion.

DETAILED DESCRIPTION OF THE INVENTION

With reference to the drawings, the invention will now be described with regard for the best mode and the preferred embodiment. While the tool and the method will be described with reference to a drywall material and drywall repair, it is to be understood that such references herein are to include any panel material having properties and characteristics similar to drywall material, such that a localized defect or damage may be repaired with a hand tool and a rotary tool as described, wherein the tool is capable of cutting and abrading the panel material. For example, it is to be understood that the term drywall as used in herein is to describe a class of panels including drywall, wallboard, soft wood, composite material panels, acoustic tile, resin material panels, plastic material panels and the like.

Figure 1:
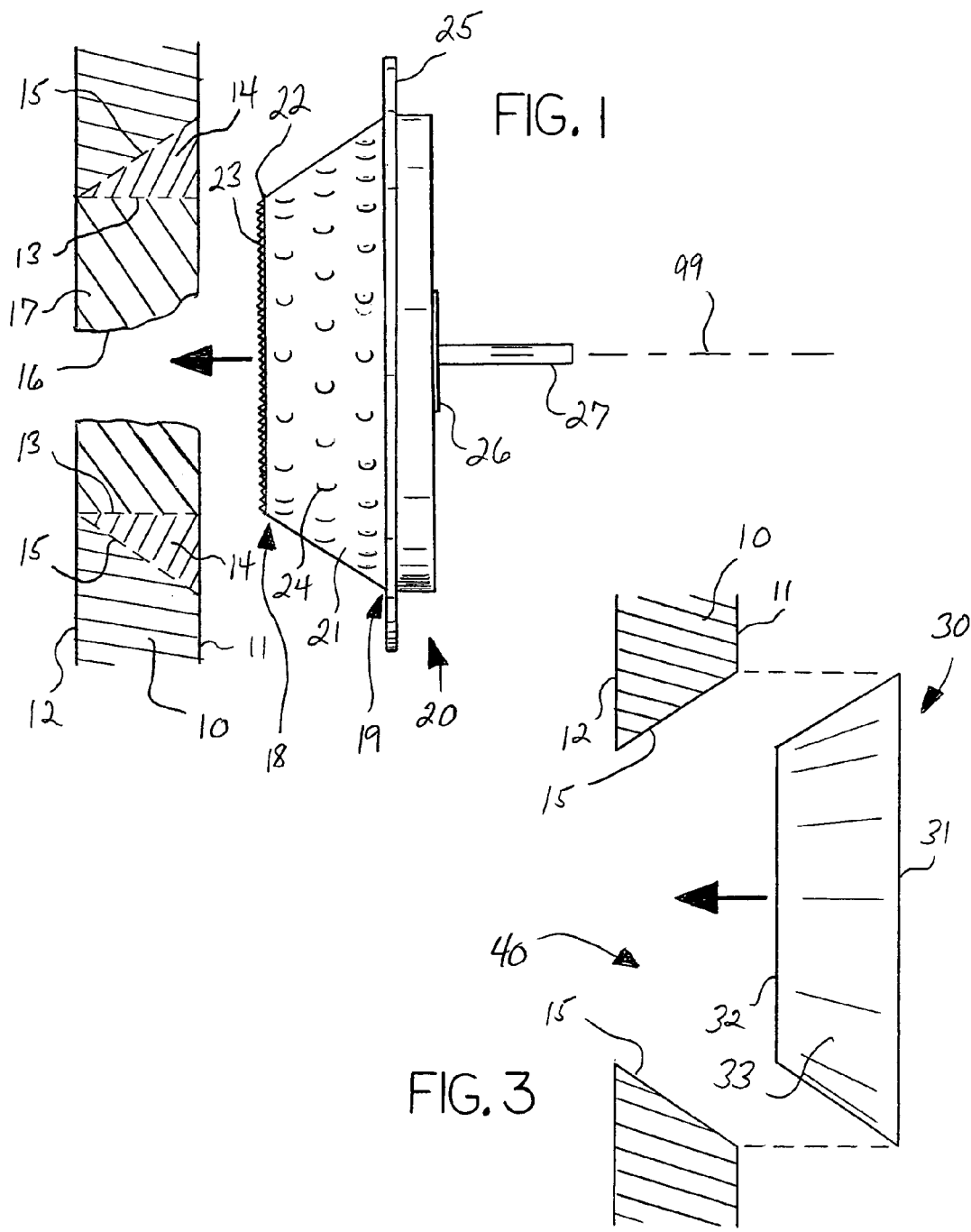
FIG. 1 is a side view of the tool of the invention and a cross-sectional view of damaged drywall.
Figure 2:
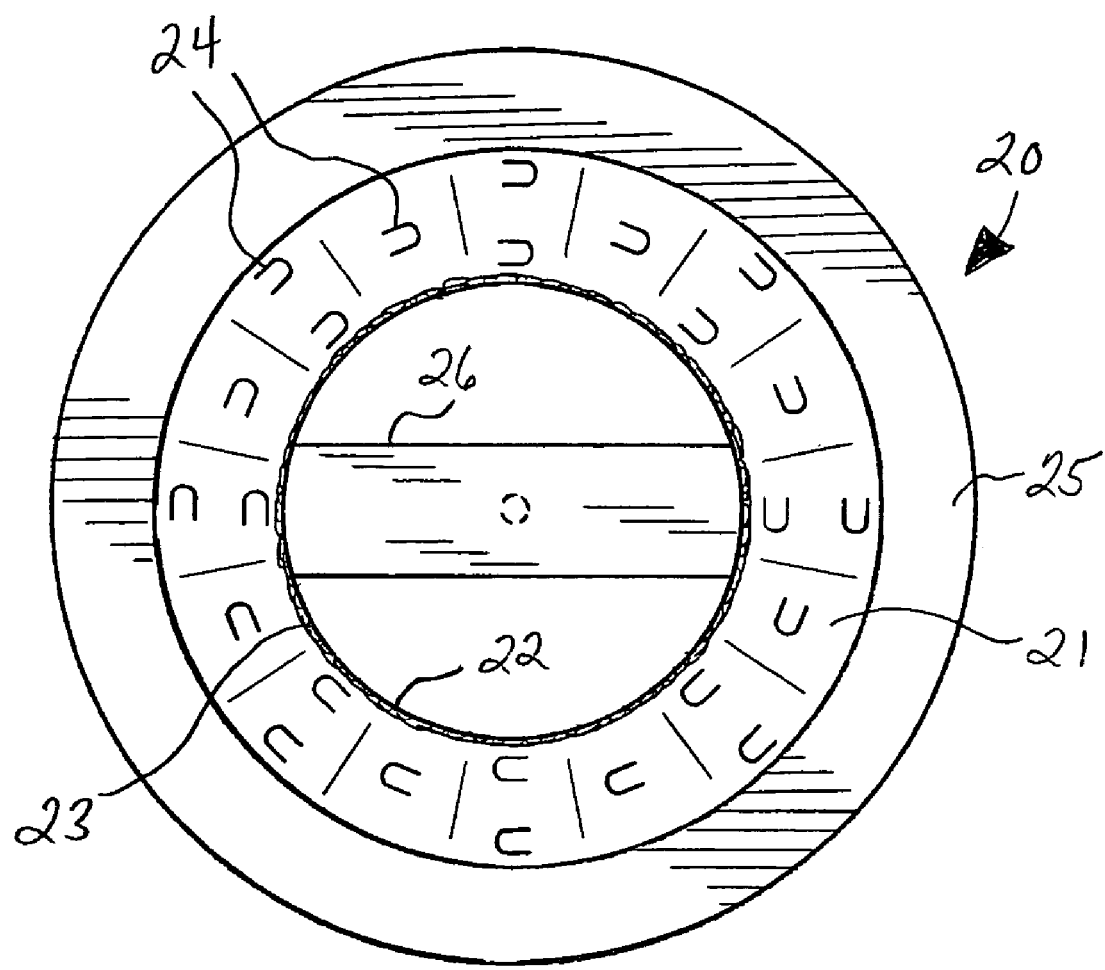
FIG. 2 is front view of the tool of the invention.

In general, the invention is both a tool 20 for drywall repair and the method of repairing drywall 10 utilizing the tool 20. As shown in FIGS. 1 and 2, the drywall repair tool 20 comprises abrading surface 21 in the configuration of a truncated cone and having an open interior, whereby the distal or operative end 18 of the abrading surface 21 is of a smaller diameter than the proximal end 19 of the abrading surface 21. Abrading members 24 capable of abrading the drywall 10 through rotation of the tool 20 are disposed on the abrading surface 21, and may comprise abrasive particles, projections, shavers, ridges, graters, teeth or the like, such being similar in composition and function for example to such well known tools as files, grinders, graters, sand paper, etc. Where physical structures such as teeth, shavers, projections or the like are utilized, the abrading members 24 and/or abrading surface 21 may incorporate apertures, slits or the like such that abraded material can pass through the abrading surface 21 into the interior of the tool 20. The abrading members 24 may be disposed on the abrading surface 21 such that the abrading action is accomplished by rotation in only one direction or bi-directionally.

The distal or operating end of the abrading surface 21 defines a circular cutting rim 22. Cutting rim 22 further comprises cutting members 23 capable of cutting or sawing through the drywall 10, and in particular cutting members 23 are capable of initiating a cut into the outer surface 11 and through the body of the drywall 10. Cutting members 23 may comprise teeth in the nature of those found on saws, abrasive particles, projections, ridges, or any other similar physical feature.

Mounted at the proximal end of the abrading surface 21 is an annular abutment flange or collar member 25 that is disposed in a plane perpendicular to the axis of rotation 99 of the tool 20. The annular collar member 25 extends radially outward a short distance from the abrading surface 21 and defines a stop or abutment member such that forward advancement of the tool 20 is limited. In addition, the annular collar member 25 insures that the final abrading action of the drywall occurs with the tool 20 oriented flat against the drywall outer surface 11, that the axis of rotation 99 is perpendicular to the outer surface 11, and that the outer diameter of the hole 40 created by the tool 20 has a predetermined dimension, such that all holes 40 created by the tool 20 are of the same size, thus enabling pre-manufactured replacement plugs 30 to be utilized in the repair.

The drywall repair tool 20 further comprises means to rotate the abrading surface 21 and cutting rim 22, such as a handle 26 and/or preferably a shaft 27 to be received by a rotary drill, such that the tool 20 can be rotated either manually or by a power drill or similar device for transferring rotary power to a workpiece. In the embodiment shown, the tool has both a handle 26 and a shaft 27, but the tool 20 may also comprise a handle for manual use or a shaft for retention by a drill.

The methodology of the invention comprises using the tool 20 to repair a localized defect or damage 16 in drywall 10. As shown in FIGS. 1 and 3, the drywall 10 comprises an outer surface 11 and an inner surface 12. To repair the defect 16, the tool 20 is positioned such that the cutting rim 22 encircles the defect 16. The tool 20 is rotated and advanced, such that the cutting members 23 cut into the outer surface 11, through the body of the drywall 10 and through the inner surface 12. In this manner the cutting rim 22 creates a cut line 13 that is perpendicular to the drywall outer surface 11 and produces a discard plug 17 having perpendicular sides, the discard plug 17 ending up inside the abrading surface 21.

As the cutting rim 22 advances through the drywall 10, the abrading surface 21 comes into contact with the drywall 10. The abrading surface 21 grinds away the drywall material within an abraded region 14, such that when the tool 20 is fully advanced and the annular collar 25 contacts the drywall outer surface 11, a hole 40 is created that has a conical wall 15 disposed at an angle corresponding to that of the abrading surface 21, such that the diameter of hole the 40 at the drywall inner surface 12 is smaller than the diameter of the hole 40 at the drywall outer surface 11, as shown in FIG. 3.

Because the hole 40 created by tool 20 is uniform, replacement plugs 30 of proper size and configuration may be manufactured in advance and sold in conjunction with tool 20 as a kit. The replacement plugs 30 are made of drywall material, resin, composite or any outer suitable material, and are shaped to match the hole 40, having a planar outer surface 31, a planar inner surface 32 and a conical plug wall 33, where the diameter of the conical plug wall 33 is greater at the plug outer surface 31 than at the plug inner surface 33, with the dimensions corresponding to those of hole 40. In this manner, the replacement plug 30 may be adhesively secured within hole 40 for a rapid and effective repair of the defect 16. Because the conical wall 15 and the plug conical wall 33 are correspondingly slanted, there is no need to install any backing structure prior to insertion of the replacement plug 30, as it cannot pass through the hole 40.

It is understood that equivalents and substitutions for certain elements set forth above may be obvious to those skilled in the art, and therefore the true scope and definition of the invention is to be as set forth in the following claims.

I claim:

1. A drywall repair tool comprising:
   an abrading surface having a truncated cone configuration, a distal end and a proximal end;
   abrading members disposed on said abrading surface;
   a circular cutting rim at the distal end of said abrading surface;
   cutting members disposed on said circular cutting rim;
   an annular flange member at the proximal end of said abrading surface, whereby said annular flange member limits the forward advancement of said tool when in use; and
   rotation means to rotate said abrading surface and said cutting rim.

2. The tool of claim 1, wherein said rotation means comprises a handle.

3. The tool of claim 1, wherein said rotation means comprises a shaft to be received by a power drill.

4. The tool of claim 1, wherein said abrading members are chosen from the group of abrading members consisting of abrasive particles, projections, shavers, ridges, graters and teeth.

5. The tool of claim 1, wherein said cutting members are chosen from the group of cutting members consisting of teeth, abrasive particles, projections and ridges.

6. The tool of claim 1, wherein said abrading surface has an open interior.

7. The tool of claim 1, wherein said distal end of said abrading surface is of smaller diameter than said proximal end.

8. The tool of claim 1, further comprising an axis of rotation, and wherein said annular flange member is disposed perpendicularly to said axis of rotation.

9. The tool of claim 1, wherein said abrading surface comprises apertures.

10. A method of repairing a localized defect in drywall comprising the steps of:
    providing a drywall repair tool comprising an abrading surface having a truncated cone configuration, a distal end and a proximal end, abrading members disposed on said abrading surface, a circular cutting rim at the distal end of said abrading surface, cutting members disposed on said circular cutting rim, an annular flange member at the proximal end of said abrading surface, whereby said annular flange member limits the forward advancement of said tool when in use, and rotation means to rotate said abrading surface and said cutting rim;
    positioning said drywall repair tool on said drywall to encircle said defect with said cutting rim;
    advancing and rotating said drywall repair tool until said annular flange member contacts said drywall, thereby cutting and abrading said drywall to create a hole in said drywall having a conical wall;
    removing said drywall repair tool;

providing a replacement plug having a plug conical wall corresponding in size and configuration to said hole conical wall; and inserting and adhesively securing said replacement plug in said hole.

11. The method of claim 10, wherein said step of rotating said drywall repair tool is performed manually.

12. The method of claim 10, wherein said step of rotating said drywall repair tool is performed using a power rotary drill.

13. A kit for repairing a localized defect in drywall, said kit comprising:

a drywall repair tool comprising:

an abrading surface having a truncated cone configuration, a distal end and a proximal end;

abrading members disposed on said abrading surface;

a circular cutting rim at the distal end of said abrading surface;

cutting members disposed on said circular cutting rim;

an annular flange member at the proximal end of said abrading surface, whereby said annular flange member limits the forward advancement of said tool when in use; and rotation means to rotate said abrading surface and said cutting rim; and a replacement plug having a plug conical wall corresponding in size and configuration to said truncated cone configuration of said abrading surface;

whereby said drywall tool creates a hole in said drywall having a conical wall and said replacement plug fits into said hole.

14. The tool of claim 13, wherein said rotation means comprises a handle.

15. The tool of claim 13, wherein said rotation means comprises a shaft to be received by a power drill.

16. The tool of claim 13, wherein said abrading members are chosen from the group of abrading members consisting of abrasive particles, projections, shavers, ridges, graters and teeth.

17. The tool of claim 13, wherein said cutting members are chosen from the group of cutting members consisting of teeth, abrasive particles, projections and ridges.

18. The tool of claim 13, wherein said abrading surface has an open interior.

19. The tool of claim 13, wherein said distal end of said abrading surface is of smaller diameter than said proximal end.

20. The tool of claim 13, further comprising an axis of rotation, and wherein said annular flange member is disposed perpendicularly to said axis of rotation.

* * * * *